(12) United States Patent
Oettinger

(10) Patent No.: US 7,133,618 B2
(45) Date of Patent: Nov. 7, 2006

(54) METHOD OF ALIGNING OPTICAL WIRELESS TRANSCEIVERS COMPRISING DISTINCT MIRRORS FOR TRANSMITTING AND RECEIVING

(75) Inventor: Eric G. Oettinger, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 550 days.

(21) Appl. No.: 10/413,183

(22) Filed: Apr. 14, 2003

(65) Prior Publication Data

US 2004/0202475 A1   Oct. 14, 2004

(51) Int. Cl.
*H04B 10/00* (2006.01)

(52) U.S. Cl. ............................... 398/129; 398/131

(58) Field of Classification Search .............. 398/119, 398/129, 131, 122; 356/3.16
See application file for complete search history.

(56) References Cited

U.S. PATENT DOCUMENTS 6,323,980 B1 * 11/2001 Bloom ..................... 398/129
6,590,685 B1 * 7/2003 Mendenhall et al. ...... 398/121

* cited by examiner

*Primary Examiner*—Shi K. Li
(74) *Attorney, Agent, or Firm*—William B Kempler; W. James Brady; Frederick J. Telecky, Jr.

(57) ABSTRACT

A method simultaneously aligns the two sets of optical wireless link transceiver mirrors such that light traverses a path from the transmitting laser off an outbound mirror, through free space, off the inbound mirror of the remote station, and finally onto the receiving element in the remote station.

12 Claims, 4 Drawing Sheets

METHOD OF ALIGNING OPTICAL WIRELESS TRANSCEIVERS COMPRISING DISTINCT MIRRORS FOR TRANSMITTING AND RECEIVING

BACKGROUND OF THE INVENTION

1. Field of the Invention

This invention relates generally to optical wireless communication links, and more particularly, to a method of aligning optical wireless transceivers having distinct mirrors for transmitting and receiving.

2. Description of the Prior Art

FIG. 1 illustrates an optical wireless link (OWL) system 100 consisting of two stations 102, 104, in which each station 102, 104 contains an optical transmitter 106, 114 and an optical receiver 108, 116 respectively. FIG. 2 illustrates the optical components associated with a single OWL transceiver 102. Transceiver 102 can be seen to include a laser transmitter 106 and a MEMs mirror 120 for directing a transmitted beam toward a remote station 104. Although existing OWL devices are not equipped with a MEMS mirror for directing an incident beam to a receiving element, transceiver 102 also has a receiver 108 and a MEMs mirror 122 for directing an incident beam to a receiving element 121 (likely through optional magnifying optics 123) in the transceiver 102.

FIG. 3 shows an OWL receiver and an OWL transmitter including the respective field of view 124 and beam divergence 126. Looking again at FIG. 2 and considering an existing OWL device, mirror 120 directs the transmitted beam toward the remote receiver 116, which must be oriented such that its field 124 of view includes the transmitting mirror 120 in order to receive the transmitted beam. One of the limiting factors associated with modern optical wireless transceivers results from the constraint on the receiver that it have a wide field of view 124 in order to see the incident beam across a relatively large angle. A receiver with a narrow field of view 124 would allow optics to intensify the incident beam, significantly increasing the SNR and subsequently the operating range of the system 100. A narrow field of view however, requires either very accurate positioning of the transceivers 102, 104 (such that the incident laser beam falls within the field of view of the respective receivers 108, 116). Otherwise, some method of re-directing the incident beam to compensate for initial positioning error will be required. A mirror, such as 122 in FIG. 2, can be used to re-direct the beam allowing the desired narrow field of view; however, it must be positioned in the proper orientation in order for the system to function.

In view of the foregoing, it would be desirable and advantageous in the optical wireless communication art to provide a technique for simultaneously aligning the two sets of mirrors (local transmitting mirror and remote receiving mirror) such that light traverses a path from the transmitting laser 106 of the outbound mirror 120, through free space, off the inbound mirror of the remote station 104, and finally onto the receiving element in the remote station.

SUMMARY OF THE INVENTION

The present invention is directed to a method for simultaneously aligning the two sets of OWL transceiver mirrors such that light traverses a path from the transmitting laser off an outbound mirror, through free space, off the inbound mirror of the remote station, and finally onto the receiving element in the remote station.

According to one embodiment, a method of aligning optical wireless transceivers having distinct mirrors for transmitting and receiving comprises the steps of simultaneously scanning local and remote transmitting beam mirrors and local and remote incident beam receiving mirrors, wherein the transmitting mirrors are scanned at a first frequency for a first transmitting mirror axis and a second frequency for a second transmitting mirror axis, and further wherein the receiving mirrors are scanned at a third frequency for a first receiving mirror axis and a fourth frequency for a second receiving mirror axis, and further wherein the scanning amplitude is selected to substantially paint the field of view associated with a respective transmitted beam and substantially scan the field of view associated with a respective receiver; updating and transmitting position information while scanning, wherein the position information comprises local transmitting mirror first and second axis scanning data representing the position of the local transmitting mirror, and further comprises remote transmitting mirror first and second axis scanning data which is a reflection of the received scanning data; selectively halting the receive mirror second axis scanning upon detection of valid received data; selectively halting the receive mirror first axis scanning upon detection of valid received data; selectively halting the transmit mirror second axis scanning upon detection of valid received second axis remote position data subsequent to positioning the transmit mirror's second axis in response to the received second axis remote data; and selectively halting the transmit mirror first axis scanning upon detection of valid received first axis remote position data subsequent to positioning the transmit mirror's first axis in response to the received first axis remote data.

BRIEF DESCRIPTION OF THE DRAWINGS

Other aspects, features and advantages of the present invention will be readily appreciated, as the invention becomes better understood by reference to the following detailed description when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

U.S. patent application Ser. No. 09/940,763, entitled *Method And Apparatus For Aligning Optical Wireless Link*, docket number TI-32924, filed on Aug. 27, 2001, by Mark D. Heminger et al., addresses positioning data transmitted during alignment for use by a remote station, as well as information that is returned and used locally. The particular embodiments of the inventive alignment process described herein below with reference to the figures is fundamentally different however, in that 1) a receiving mirror must be positioned; and 2) the two MEMs mirrors employed as part of an optical wireless link (OWL) transceiver are scanned at a very high frequency to implement the alignment process one axis at a time. The '763 application is assigned to the assignee of the present invention, and is hereby incorporated by reference in its entirety herein.

The embodiments described herein below are directed to a two-step alignment process executed in both stations (local and remote) simultaneously. In order to preserve brevity and to provide clarity, this two-step alignment process shall be described herein from only one station's "point of view". Similar to the method described in the '763 application, the data transmitted during alignment will provide positioning information for the remote station, as well as information that will be returned and used locally. This transmitted information will herein after be referred to as MyTransmitterX, MyTransmitterY, YourTransmitterX and YourTransmitterY. The present method is different in two respects however, as described herein above.

Figure 5A:
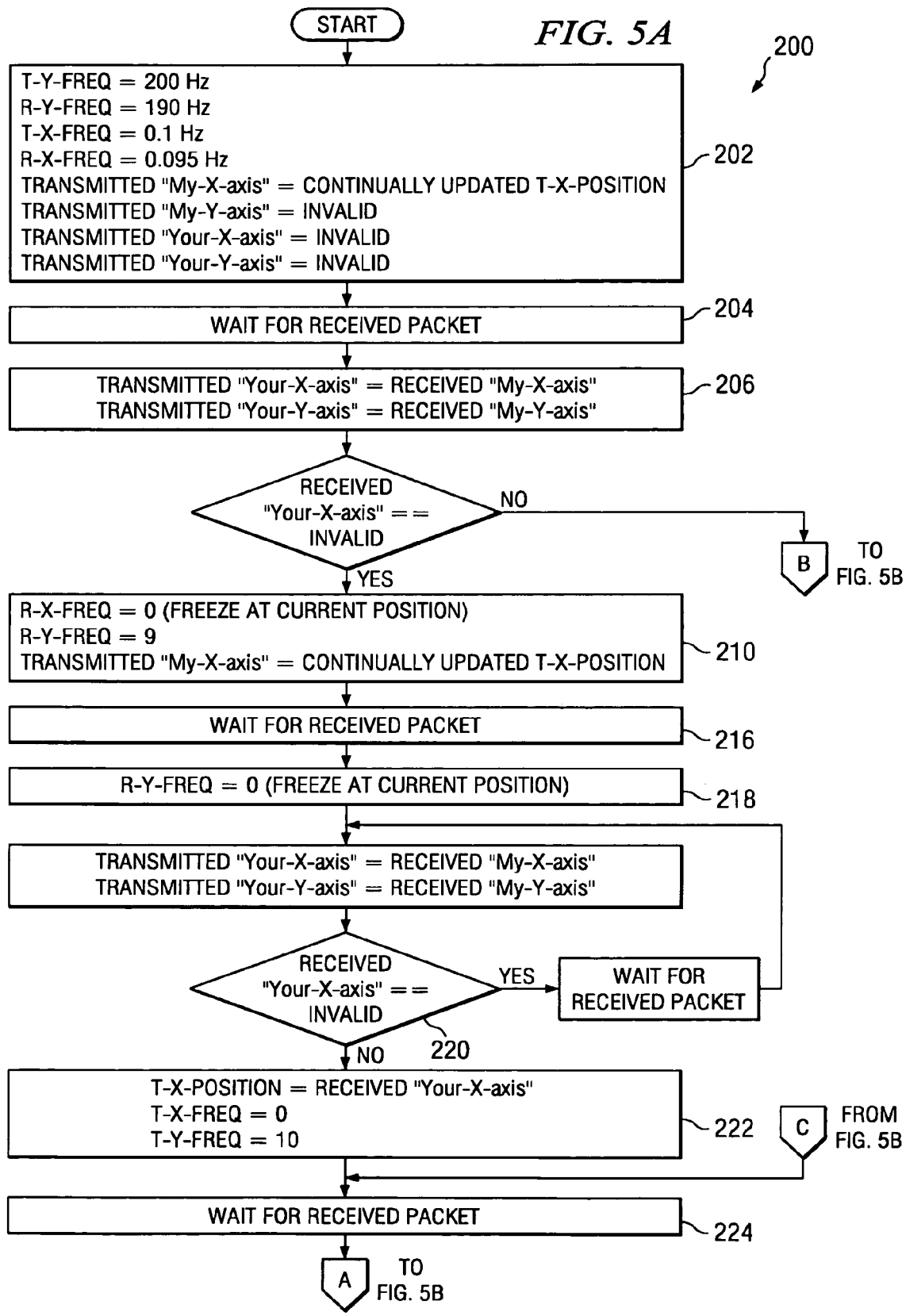
FIG. 5 is a flow chart illustrating a method of aligning optical wireless transceivers comprising distinct mirrors for transmitting and receiving according to one embodiment of the present invention.
Figure 5B:
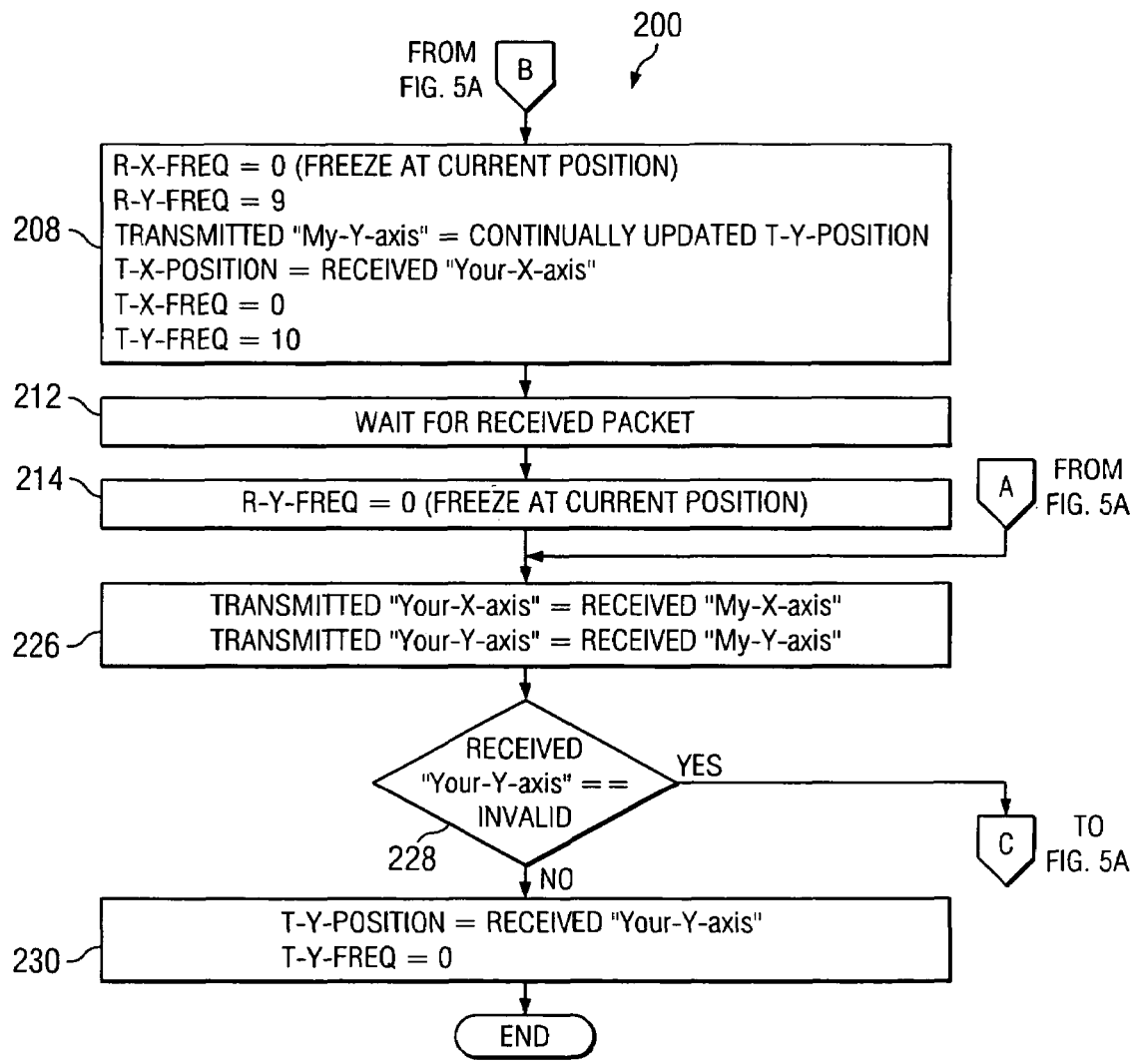

FIG. 5 is a flow chart illustrating a method 200 of aligning optical wireless transceivers comprising distinct mirrors for transmitting and receiving according to one embodiment of the present invention. The values in parenthesis are part of a data message; T represents transmitter; R represent receiver; X represent X-axis; Y represent Y-axis; and setting freq=0 effectively freezes that axis of a mirror. In the first phase of alignment shown in block 202, both mirrors (MEMs mirror 120 for directing a transmitted beam toward a remote station 104 and MEMs mirror 122 for directing an incident beam to a receiving element) are scanned at a high frequency (e.g. 200 Hz) in one axis (e.g. Y-axis) with an amplitude covering the range of motion, and at a much lower frequency on the other axis (e.g. X-axis). The X-axis rate is kept slow enough to guarantee that the beams will "see each other", if they are aligned at that X-axis point. As described in more detail below, this rate will be about 0.1 Hz, using the example below.

Y-axis rate/Field of view*beam divergence/Y-axis cycles per beat period 200 Hz/100 mrad*1 mrad/20=0.1 Hz Further, the X-axis pattern is not a sine wave, but rather a constant velocity back and forth pattern. This scanning process will result in completely "painting" the field of view with the transmitted beam and completely scanning the field of view with the detector.

As stated herein before, the transmitted data will consist of MyTransmitterX, MyTransmitterY, YourTransmitterX, and YourTransmitterY; however, during the first phase, only the X-axis value, MyTransmitterX, is updated (the Y value will be changing too fast to update). Further, the control software will maintain two more local variables (which do not need to be transmitted): MyReceiverX and MyReceiverY.

When the receiver 108 detects a packet as shown in block 204, it will update the variable YourTransmitterX with the value in the received MyTransmitterX as shown in block 206. Next, it will freeze MyReceiverX with the current X position of the receiver mirror 122 and change the receiver mirror control to "Phase Two" as shown in blocks 208, 210. Further, if the local transmitter 106 has already crossed the remote station's receiver 116, the received packet will contain a value in the YourTransmitterX field. This value represents the local X-axis control value when pointing at the remote station 104. Upon receipt of the YourTransmitterX value, the transmitting mirror 120 also transitions to "Phase Two". During "Phase Two", following reception of valid X-axis data, the variable MyTransmitterY will be continuously updated; and upon reception of a received packet as shown in block 212, the receive mirror Y-axis will be frozen in its current position as shown in block 214. During "Phase Two", following reception of invalid X-axis data, the variable MyTransmitterY will be continuously updated; and upon reception of a received packet as shown in block 216, the receive mirror Y-axis will be frozen in its current position as shown in block 218. Subsequent to freezing the receive mirror Y-axis as shown in block 218 however, the process is again repeated to determine if the received X-axis data is valid as shown in decision block 220. Upon reception of valid X-axis data, the transmit mirror X-axis position is frozen as shown in block 222. Finally, as shown in blocks 224-230, the transmit mirror Y-axis position is also frozen upon reception of valid Y-axis data.

Figure 1:
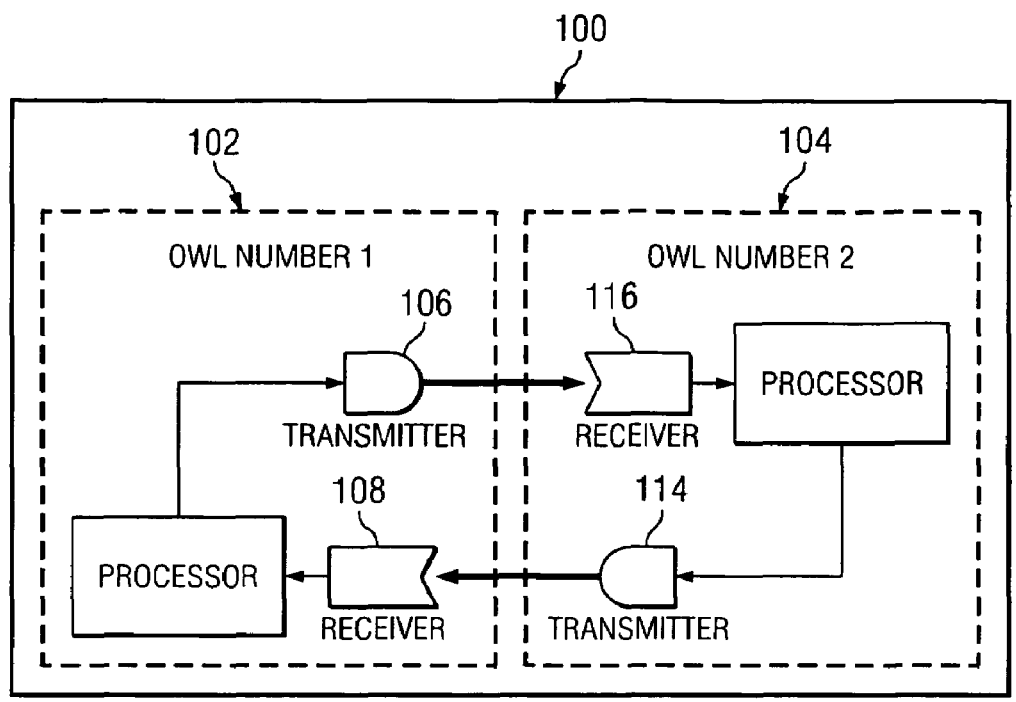
FIG. 1 illustrates an optical wireless link (OWL) system consisting of two stations, in which each station contains an optical transmitter and an optical receiver.
Figure 2:
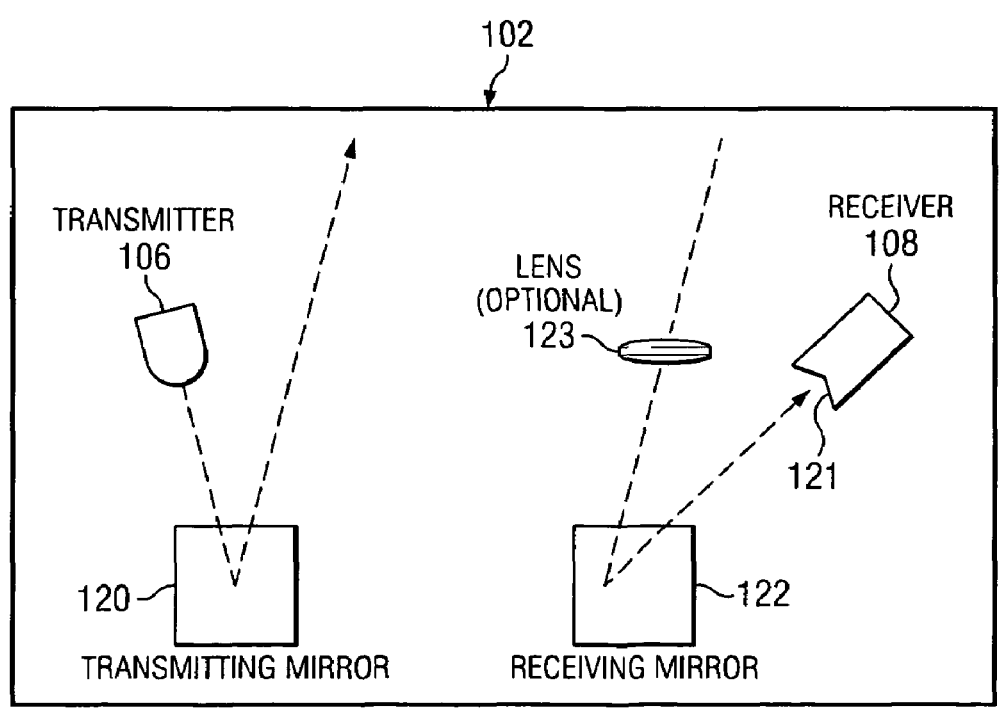
FIG. 2 illustrates the optical components associated with a single OWL transceiver.
Figure 3:
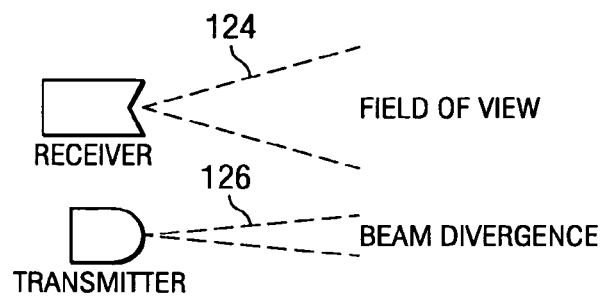
FIG. 3 shows an OWL receiver and a transmitter including the respective receiver field of view and transmitter beam divergence which are illustrative of their 3-dimensional conical shape.
Figure 4:
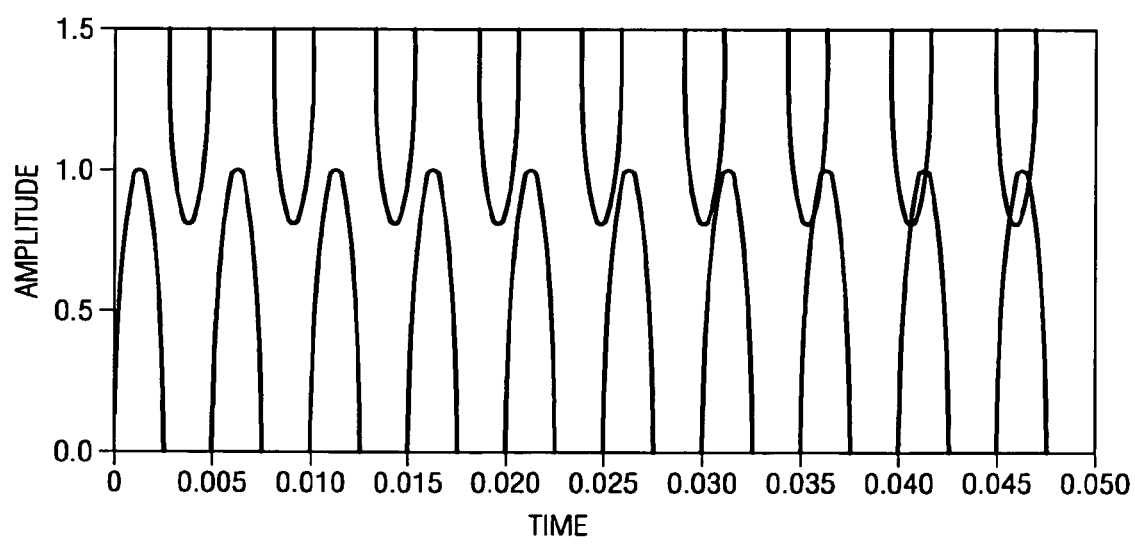
FIG. 4 is a plot illustrating the beat frequency requirement associated with an alignment process according to one embodiment.

FIG. 4 is a plot (not a X-Y position plot) illustrating the beat frequency requirement associated with the present alignment process according to one embodiment. Specifically, the plot shows the Y-axis motion versus time for a system with the receive mirror oscillating at 200 Hz (lower plot), and the transmit mirror oscillating at 190 Hz (upper plot). The stations 102, 104 are positioned such that there is a 10% overlap (poor initial alignment). The X-axis position would not have moved much during this period (something close to the divergence of the beam). It can be seen that if the X-axis is aligned, the difference in Y-axis scan frequencies will sync the Y-axes at some point.

Following the same reasoning, since the X-axis sweep rates are doing the same basic thing, they will also at some point be aligned. It can be appreciated that the X-axis alignment will however, take considerably longer, due to the slower scan rates.

During "Phase Two", the X-axis control effort is frozen (or possibly very slowly oscillates within a very small amplitude-something on the order of the divergence of the beam). The Y-axis control slows down from the high frequency (200 Hz), which it had been traveling at, to a speed where it can update the position values at roughly the rate that the beam moves one "spot size" (likely something in the 10 Hz range). A similar "ICUC" process follows for the Y-axis to find the final location for both mirrors 120, 122. This second phase should finish very quickly—again on the order of the period of the beat frequency, between say 10 and 9 Hz—so another second.

Total acquisition time then is dominated by the first phase and will be in the neighborhood of the period of the beat frequency between the slow oscillations. Regarding the example described herein before, if 200 Hz is chosen for one mirror, and 190 Hz is chosen for the other mirror, and if the slower axis is operated at 1/2000 of these rates, then the slower axes would be running at 0.1 Hz and 0.095 Hz respectively, resulting in a beat frequency of 0.005 Hz or a 200 second period.

In view of the above, it can be seen the present invention presents a significant advancement in the art of optical wireless communication techniques. Further, this invention has been described in considerable detail in order to provide those skilled in the optical wireless communication art with the information needed to apply the novel principles and to construct and use such specialized components as are required. It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of aligning optical wireless transceivers having distinct mirrors for transmitting and receiving, the method comprising the steps of:
   simultaneously scanning local and remote transmitting beam mirrors and local and remote incident beam receiving mirrors, wherein the transmitting mirrors are scanned at a first frequency for a first transmitting mirror axis and a second frequency for a second transmitting mirror axis, and further wherein the receiving mirrors are scanned at a third frequency for a first receiving mirror axis and a fourth frequency for a second receiving mirror axis, and further wherein the scanning amplitude is selected to substantially paint the field of view associated with a respective transmitted beam and substantially scan the field of view associated with a respective receiver;
   updating and transmitting position information while scanning, wherein the position information comprises local transmitting mirror first and second axis scanning data representing the position of the local transmitting mirror, and further comprises remote transmitting mirror first and second axis scanning data which contains the received scanning data;
   halting the receiving mirror second axis scanning upon detection of first valid received data, first axis scanning continues;
   halting the receiving mirror first axis scanning upon detection of second valid received data;
   receiving valid second axis remote position data;
   halting the transmitting mirror second axis scanning;
   positioning the transmitting second axis in response to the valid received second axis remote position data;
   receiving valid first axis remote position data;
   halting the transmitting mirror first axis scanning;
   positioning the transmitting first axis in response to the valid received first axis remote position data.

2. The method according to claim 1, wherein scanning frequencies associated with the first axes of the transmitting and receiving mirrors are not identical, resulting in a first axes beat frequency, and further wherein scanning frequencies associated with the second axes of the transmitting and receiving mirrors are not identical, resulting in a second axes beat frequency.

3. The method according to claim 1, wherein scanning frequencies associated with the first axes of the transmitting and receiving mirrors are substantially higher than scanning frequencies associated with the second axes of the transmitting and receiving mirrors.

4. The method according to claim 1, wherein scanning frequencies associated with the receiving mirror first axis are responsive to a received data packet.

5. The method according to claim 4, wherein receiving mirror second axis scanning stops only subsequent to receiving mirror first axis frequency changes.

6. The method according to claim 1, wherein scanning frequencies associated with the transmitting mirror first axis change only in response to a received data packet having valid remote position data.

7. The method according to claim 6, wherein transmitting mirror second axis scanning stops only subsequent to transmitting mirror first axis frequency changes.

8. The method according to claim 1, wherein the step of updating comprises updating a remote transmitting mirror second axis variable with a local transmitting mirror second axis variable.

9. The method according to claim 1, wherein the step of selectively halting the transmitting mirror second axis scanning upon detection of valid received second axis remote position data comprises selectively halting a respective transmitting mirror in its most current second axis position to realize a desired second axis position.

10. The method according to claim 1, wherein the step of updating comprises updating a remote transmitting mirror first axis variable with a local transmitting mirror first axis variable.

11. The method according to claim 1, wherein the step of selectively halting the transmitting mirror first axis scanning upon detection of valid received first axis remote position data comprises selectively halting a respective transmitting mirror in its most current first axis position to realize a desired first axis position.

12. The method according to claim 1, wherein the second axis scanning is implemented at a constant velocity in a back and forth pattern.

* * * * *